US011301913B1

(12) United States Patent
Nandi et al.

(10) Patent No.: US 11,301,913 B1
(45) Date of Patent: Apr. 12, 2022

(54) TYPE COMPLETENESS DETECTION SYSTEM

(71) Applicant: Amazon Technologies, Inc., Seattle, WA (US)

(72) Inventors: Subhrangshu Nandi, Seattle, WA (US); Vishal Rathi, Seattle, WA (US); Emilio Ian Maldonado, Bothell, WA (US); Wisam Hussain, Seattle, WA (US); Hussain Badruddin Penwala, Seattle, WA (US); Yi Lei, Bothell, WA (US); Alice Helen Swanberg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 16/541,089

(22) Filed: Aug. 14, 2019

(51) Int. Cl.
| | |
|---|---|
| *G06Q 30/00* | (2012.01) |
| *G06Q 30/06* | (2012.01) |
| *G06F 16/9538* | (2019.01) |
| *G06F 16/2457* | (2019.01) |
| *G06F 16/9535* | (2019.01) |

(52) U.S. Cl.
CPC ... *G06Q 30/0625* (2013.01); *G06F 16/24578* (2019.01); *G06F 16/9535* (2019.01); *G06F 16/9538* (2019.01)

(58) Field of Classification Search
CPC ............ G06Q 30/0625; G06F 16/9535; G06F 16/24578; G06F 16/9538
See application file for complete search history.

(56) References Cited

U.S. PATENT DOCUMENTS

| | | | | |
|---|---|---|---|---|
| 6,489,968 | B1* | 12/2002 | Ortega | G06F 3/0482 |
| | | | | 715/713 |
| 7,647,309 | B1* | 1/2010 | Bar | G06Q 30/06 |
| | | | | 707/713 |
| 10,474,670 | B1* | 11/2019 | Hoover | G06N 7/005 |
| 10,783,167 | B1* | 9/2020 | Dutta | G06F 16/24578 |
| 2018/0052905 | A1* | 2/2018 | Zhicharevich | G06F 16/2272 |
| 2019/0318009 | A1* | 10/2019 | Miller | G06F 16/3322 |

OTHER PUBLICATIONS

Gargi, Ullas. "Unifying browse and search in information hierarchies." Technical Report 2003.180 (2003).*

\* cited by examiner

*Primary Examiner* — Kathleen Palavecino
(74) *Attorney, Agent, or Firm* — Knobbe, Martens, Olson & Bear, LLP

(57) ABSTRACT

Type completeness detection methods and systems are provided to determine a browse node completeness score for browse nodes in an electronic catalog. For example, the type completeness detection system may select a browse node, identify a plurality of search queries previously submitted by users of the electronic catalog, determine a plurality of items that are frequently selected after submitting the search queries, calculate a query completeness score for each search query, determine a browse node completeness score for the browse node, and initiate an action in response to determining that the browse node completeness score falls below a threshold value.

16 Claims, 7 Drawing Sheets

TYPE COMPLETENESS DETECTION SYSTEM

BACKGROUND

An online store may be interested in evaluating the accuracy or completeness of labels, descriptions, categories or other information associated with items listed in the online store. For example, an individual seller or retailer may upload a new item listing for inclusion in an electronic catalog of an online store and choose one or more labels, search terms, or item categories to associate with the new item. An individual item may often be relevant to multiple categories, so it may be possible for similar items to be associated with multiple distinct labels, types, or categories. A user may therefore experience frustration when trying to search for the item because the item may not be labeled according to the user's expectations. Because users may constantly produce and list on the online store every day, it would be prohibitively expensive in terms of human labor and/or computer processing time to check if every single browse node or label includes every relevant item.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
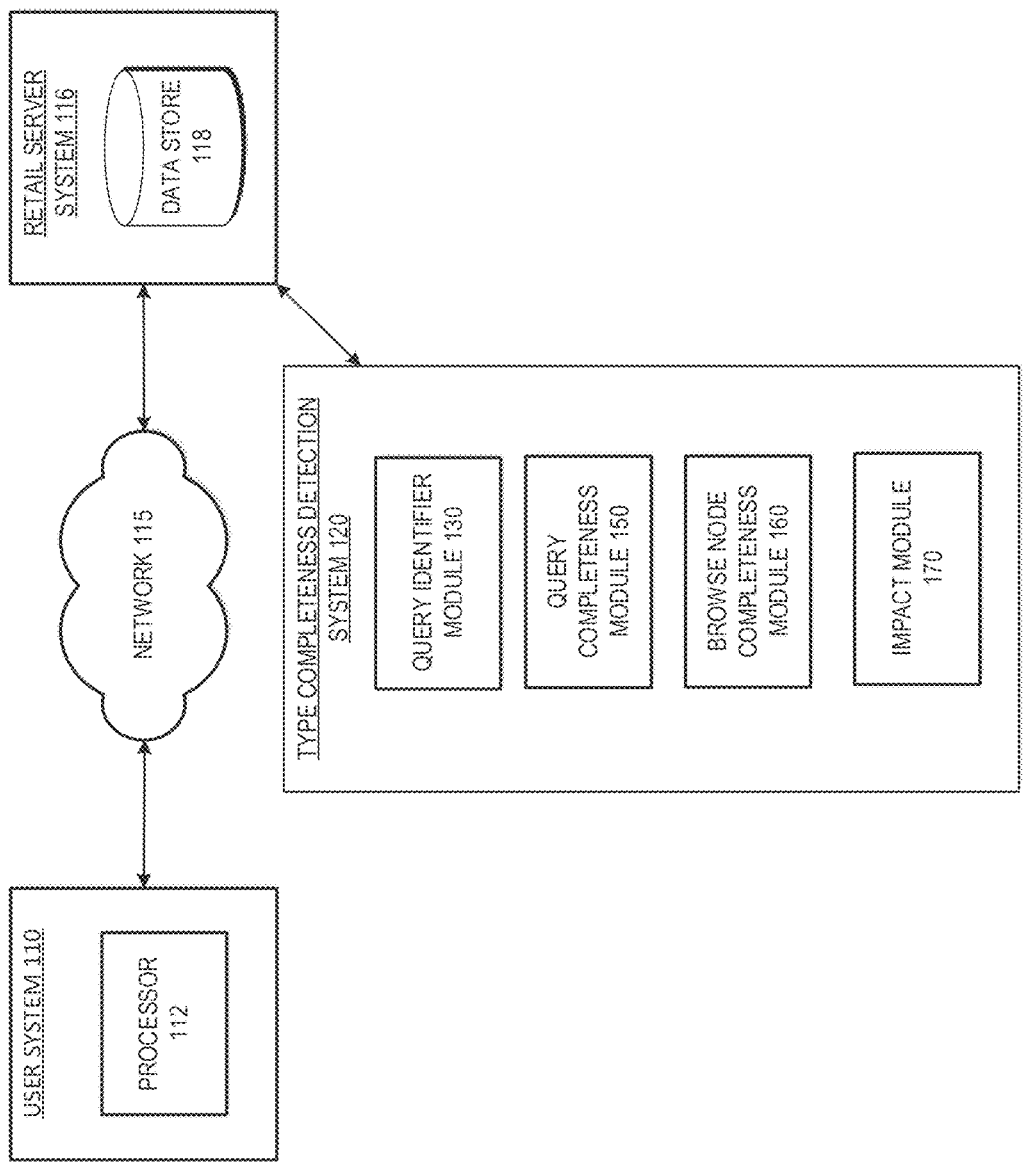
FIG. 1 is an illustrative networked environment and system architecture of a type completeness detection system, according to some embodiments.

Aspects of the present disclosure relate to utilizing techniques to quantify completeness of existing item categories, nodes, or item types and to take an action upon a determined completeness metric for one or more nodes, types, or categories. Detecting and addressing item type completeness given a searchable domain of items, item types, categories, and/or labels may be accomplished in different manners, such as using different algorithms, different machine learning techniques, and/or different searching methodologies, as will be further described below. Completeness of a given node, for example, may at a high level refer to the extent to which items that should ideally be assigned to the given node are in fact assigned to that node (e.g., items that a typical user would consider to be running shoes being classified within a node labeled "Running Shoes"). As will be described below, aspects of the present disclosure relate to various efficient manners in which various completeness analysis may be performed that approximates the true completeness of a node without necessarily analyzing every item in an electronic catalog.

As will be described herein, a type completeness detection system may select a browse node or item type, identify a plurality of related search queries previously submitted by users in an electronic catalog who provided user consent for their search queries to be used for purposes described herein, and determine a plurality of items that are most frequently returned for those queries. In one embodiment, the type completeness detection system may then determine a completeness score for individual queries, aggregate the completeness scores of the queries, determine a completeness score for a node or item type based at least partly on the aggregated completeness scores of the queries, and initiate an action in response to determining completeness, such as in response to detecting that a completeness score for a node falls below a threshold. As will further be discussed below, the type completeness detection system may divide the method and processes among various modules or system components.

The task of determining completeness in item categories according to previously used methods typically involves hiring a taxonomist and/or classification specialist to manually determine if each item in the catalog should be assigned to a particular item category or label in the electronic catalog. While this approach may successfully identify mismatches between item labels and consumer expectations that may lead to customer confusion (e.g., a customer may only find 50 results for baby shampoo products under a "baby shampoo" label when there are thousands of results responsive to a "baby shampoo" search query), such a method becomes increasingly inefficient and costly as the size of the electronic catalog increases day by day. Confusion regarding the completeness or accuracy of an item label, category, or browse node in the electronic catalog is further compounded by the fact that any given item in the electronic catalog may have multiple uses that may not necessarily be contemplated by the taxonomist (e.g., a fashionable tote bag may be used by some people as a simple shopping bag). Furthermore, a taxonomist's or classification specialist's view on the completeness of a browse node may not necessarily align with what the general public may expect. For example, while an experienced classification specialist may place a fidget spinner item under a "Novelty & More" node or label, many customers may instead view the fidget spinner as a popular children's toy and may therefore expect to find fidget spinner items under a "Children's Toys" node or label.

Because taxonomists and classification specialists may have difficulty deciding the best browse nodes for each item, traditional machine learning-based classification systems may also suffer in accuracy because the training data itself may be inappropriately labeled by taxonomists or classification specialists. In view of the above issues and the fact that there is currently no mechanism to quantify node completeness in a large electronic catalog, it is desirable for a system to be configured to reliably and quickly identify completeness among item categories or nodes and alert an administrative user or take an appropriate automated action to remedy incomplete or deficient nodes.

Furthermore, the act of properly displaying complete item selections in a relevant node may prove difficult because sellers may introduce a level of ambiguity or inaccuracy when listing items in the online s Typically, a seller may upload images and textual descriptions of an item for sale on an electronic store. The seller may also be asked to choose an existing category, department, or label to apply to an item so that the item appears in relevant search results. However, a seller may place an item under one category but may have meant a different category, or the seller may place duplicate item listings in all potentially relevant categories. Seller confusion in the initial categorization process may ultimately lead to incomplete search results and customer confusion as described above. Thus, a healthy online store requires a way to determine the completeness of search queries and browse nodes and to remedy incomplete or irrelevant listings to provide for a frustration-free user experience for customers.

Although an electronic or online store may be configured to facilitate the purchase or rental of goods on a website using text-based search queries, it will be appreciated that other possibilities exist in other embodiments. For example, in some embodiments, an online or electronic store may be a collection of network-accessible services executed on computer hardware that provides multiple channels through which customers can access electronic catalogs stored in databases to find various available products and/or services. For example, an online store may be accessible via a mobile application on a handheld user computing device and may allow voice-based search queries to discover products or services relevant to a received audio query from a user computing device or smart speaker.

Methods and systems disclosed herein address the problems noted above and others, allowing a system to use automated methods to automatically determine a completeness metric of browse nodes by examining customer actions with respect to an electronic catalog. For example, in some embodiments described herein, a type completeness detection system may receive a browse node or item type, identify a plurality of search queries previously submitted by users of the electronic catalog (who provided user consent for their search queries to be used for purposes described herein), determine a plurality of items that are frequently returned after submitting the search queries, determine a completeness score for each query, aggregate the completeness scores of the queries, determine a completeness score for a node or item type based at least partly on the aggregated completeness scores of the queries, and initiate an action in response to determining completeness. The extent to which items in the plurality of frequently returned items are labeled or assigned to a particular browse node may be a basis for determining the completeness of a browse node. The type completeness detection system may also transmit a notification regarding the completeness level of a node to a user or may automatically take action to remedy a browse node with incomplete item listings.

There are many technical and practical benefits to utilizing the type completeness detection system and methods described herein. By leveraging recorded user behavior with respect to an electronic catalog, the type completeness detection methods described herein may pinpoint specific browse nodes that have commonly caused actual confusion to users rather than iterating through each and every possible item and browse node in the electronic catalog. For example, it would be prohibitively costly and potentially technically infeasible (depending on the size of the electronic catalog) to examine user behavior for each and every item in the catalog to determine each item's relevance to a given item type or category. Rather, by examining only the items or browse nodes that are frequently selected after a user submits a search query associated with an item type, the type completeness detection system may narrow the problem space and examine the browse nodes or items with the most search, browse and/or purchase activity. In contrast, other methods may need to manually iterate through all possible items and item types. By reducing the problem size in view of historical user behavior and quantifying completeness, the techniques described herein significantly reduce the inefficiencies of various types of completeness detection (including completeness detection in a network-based retail environment), allowing completeness to be determined in a methodical and scalable way.

FIG. 1 is an illustrative networked environment and system architecture of a type completeness detection system, according to some embodiments. The illustrative environment includes a user system 110, a network 115, a type completeness detection system 120, and a retail server system 116. In some embodiments, user system 110 may be a computer, handheld mobile computing device, or other computing system. In some embodiments, a number of computing systems may each be used by a number of different users to submit user input queries to retail server system 116. In some embodiments, the user system 110 may utilize processor 112 to generate a user interface and execute user inputs to interact with retail server system 116. In some embodiments, user search queries submitted from user system 110 may be transmitted remotely to retail server system 116 over network 115. In some embodiments, retail server system 116 may process user search queries and output search results in response to a user search query. In some embodiments, retail server system 116 may store a log of user search queries, navigation paths, clicks or other user selections, and purchases in data store 118. For example, in some embodiments, retail server system 116 may be or include a cloud storage system associated with an online retail service for storing or backing up data securely on a remote server. In some embodiments, data store 118 may also comprise entries representing item categories, item subcategories or browse nodes, and items.

In some embodiments, type completeness detection system 120 may be in communication with retail server system 116 to perform completeness detection of browse nodes stored in data store 118. After retail server system 116 has received and stored historical user data (e.g., search histories, browse histories, purchase histories, and/or other behavioral and/or clickstream data) in data store 118, the type completeness detection system 120 may utilize query identifier module 130 to identify search queries to use for determining completeness scores for browse nodes. As will be discussed further below, in some embodiments the query identifier module 130 may track how frequently a term has appeared in previously submitted search queries and which item type, label, or item category is mapped to the term in the electronic catalog. For example, a search query of "monitors" may be associated with an item type "Electronics" or the item type "Computer Monitors."

In other embodiments, the type completeness detection system may begin the completeness detection method by starting with a particular item type or category. For example, given an item type "Computer Monitors," the type completeness detection system may examine historical logs stored in data store 118 and determine that "monitors" is the most popular search query associated with the given item category or type. This could be determined, for example, by identifying that "monitors" was the most common search term entered by users who ended up purchasing an item of the "Computer Monitors" item type shortly after entering their search query. In some embodiments, each search may be associated with a unique search identifier and may be associated with information regarding the last browse node that was selected or clicked on during the browse session of the search, or that includes an item that was the last item selected or viewed in the session. For example, the type completeness detection system 120 may examine historical logs and identify the unique search identifiers associated with searches where the particular browse node (or an item within such browse node) was the last to be selected, viewed or purchased from during a user search of the electronic catalog.

Once the query identifier module 130 identifies one or more popular search queries associated with an item type or category, the query identifier module 130 may identify items associated with each search query. In some embodiments, the query identifier module 130 may identify a plurality of items by examining user actions after a particular search query is submitted. For example, historical records (such as stored user activity data) may indicate that the majority of users selected either the item "Carbon Fiber Badminton Racquet" or "Gamma Tennis Racquet" after submitting a search query for "sport racquet." In some embodiments, the plurality of items associated with each search query may be the top n frequently-selected items that users have historically selected after submitting a particular search result. For example, the plurality of items associated with a search query "tennis balls" may include the top ten most-frequently selected items that users historically selected (such as over a particular time period) after receiving results for the "tennis balls" search query.

Once the query identifier module 130 identifies one or more popular search queries associated with an item type and identifies a plurality of items associated with a query, the query completeness module 150 may compute a completeness score associated with the query. In some embodiments, the query completeness module 150 may compute a completeness score for a query by examining the number of items from the plurality of items associated with the search query that are assigned to the given browse node. For example, for a browse node N, the type completeness detection system 120 may identify the k most frequent queries, Q where N was the last browse node in the search query sessions. For every query $q \in Q$ the type completeness detection system 120 may identify the top n most search impressed items $A_{q,n}$ (search impressed referring to items actually displayed to users in search results rather than merely being identified by the system as a search result), where the number of items in $A_{q,n}$ that are assigned in node N may be considered the completeness score of the query in some embodiments. In some embodiments, the completeness score of a query q given a browse node N may be defined as, in some embodiments:

$$c_q = \frac{1}{n}\sum_{i=1}^{n} \mathbb{1}\,[a_i \in N]$$

where $a_i \in A_{q,n}$, and $\mathbb{1}[a_i \in N]=1$ if $a_i \in N$, else 0. In some embodiments, the completeness score associated with a query may also be weighted. For example, in some embodiments, the query completeness score may be weighted by a variety of item conversion metrics such as search impression, item views and/or item purchase metrics.

Once the completeness score of individual queries are calculated by the query completeness module 150, the browse node completeness module 160 may compute a completeness score on the browse node level. In some embodiments, the browse node completeness module 160 may aggregate the completeness scores associated with the queries by a weighted average. For example, the browse node completeness module 160 may define a browse node completeness score as, in one embodiment:

$$c_n = \sum_{j=1}^{k} c_{q_j} * f_j,$$

where $q_j \in Q$ and $f_j$ represents the query frequency of query $q_j$.

In some embodiments, the browse node completeness score may be a numerical value between 0 and 1 (e.g., 0.6) or a percentage value between 0% and 100% (e.g., 60%). In some embodiments, a higher numerical value of the browse node completeness score may indicate a higher completeness level associated with the particular browse node. In some embodiments, the type completeness detection system 120 may aggregate the individual browse node completeness scores to determine a completeness metric for a collection of nodes. In some embodiments, the completeness metric or score for a collection of nodes may be computed using an equation similar to the equation listed above associated with computing a browse node completeness score.

Impact module 170 may execute commands or cause an automated responsive action to be performed after the browse node completeness module 160 determines a browse node completeness score for a particular browse node. In some embodiments, impact module 170 may generate an alert, push notification, text message, email notification, or other notification and transmit the notification to an administrator user of the retail server system 116. In some embodiments, the notification may include a recommendation to take an action. For example, a notification may recommend that the administrator assign a particular item to the browse node or remove an item from the browse node. In some embodiments, the impact module 170 may provide feedback in the form of a report noting which browse nodes are associated with a low completeness score given a particular search query. In some embodiments, the impact module may automatically take action if the type completeness detection system 120 identifies an item belonging to a node with a low completeness score. For example, the impact module 170 may automatically display a notification on a search results page of the electronic catalog noting that a particular item belongs to a node with a low completeness score for a given search query, or may suppress or filter certain search results based on completeness scores.

It will be appreciated that completeness detection features described herein may be implemented in a number of different environments than the one illustrated in FIG. 1. For example, modules illustrated as part of type completeness detection system 120 could instead be included within a computing system, such as retail server system 116, such that the retail server system 116 may detect type completeness in the electronic catalog as described herein without network accessibility or any external type completeness detection system. Similarly, modules illustrated as part of type completeness detection system 120 could instead be included within a variety of servers, network-accessible services or other systems that provide a variety of features in order to incorporate improved completeness detection functionality with such features.

Figure 2A:
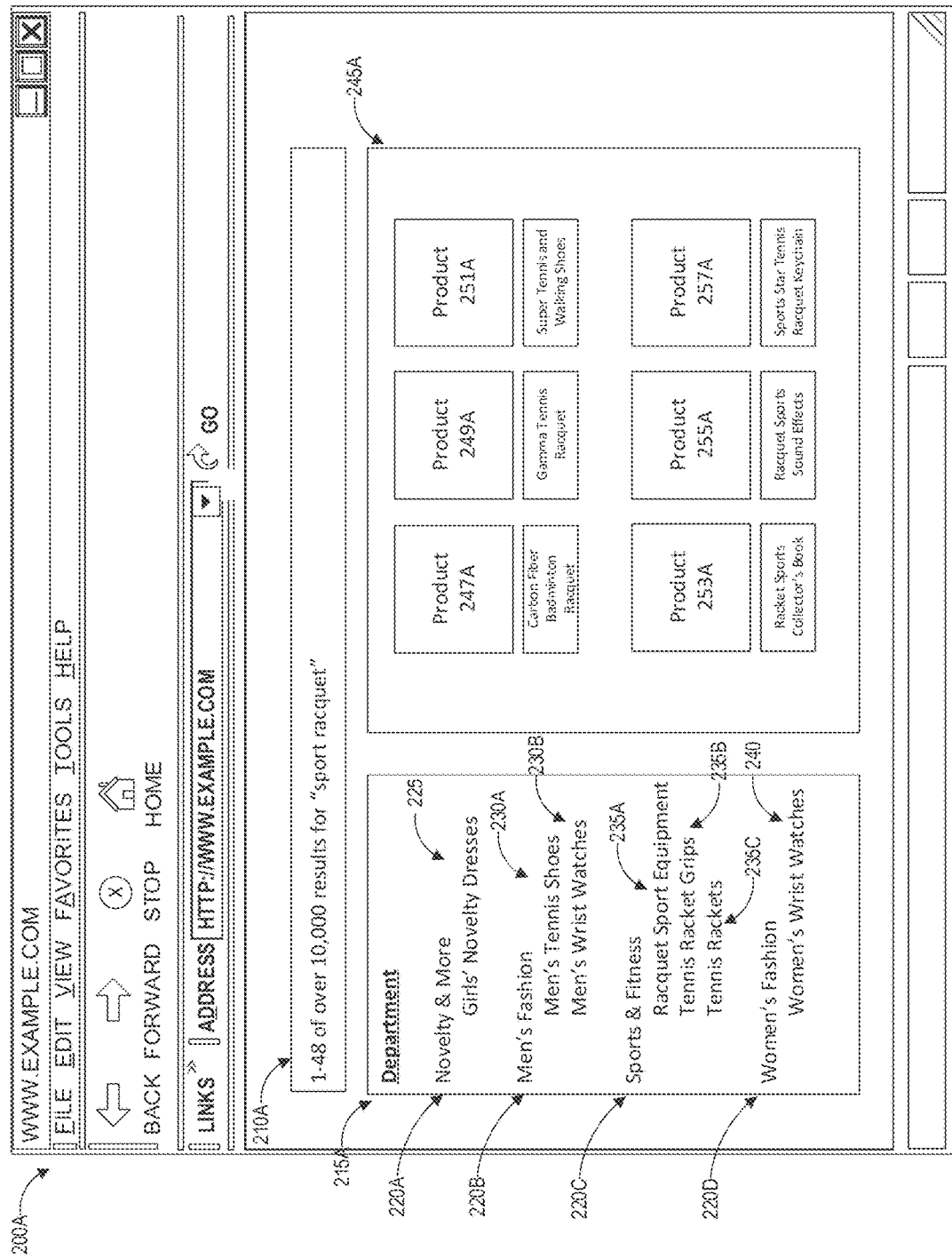
FIGS. 2A and 2B are example user interfaces displaying the results of a search query from a user's perspective, according to some embodiments.
Figure 2B:
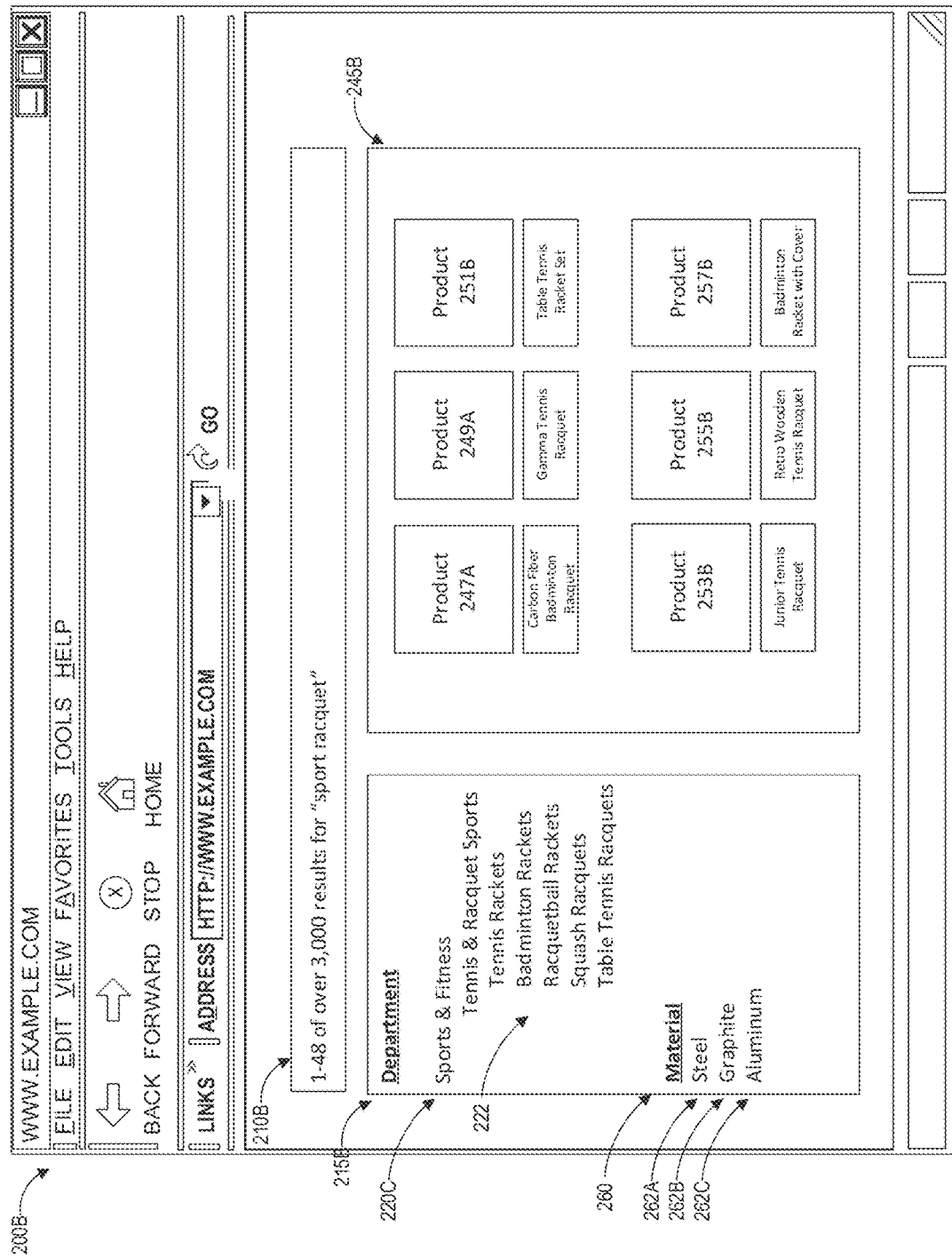

FIGS. 2A and 2B are example user interfaces displaying the results of a search query from a user's perspective when interacting with an electronic catalog. In FIG. 2A, user interface 200A depicts a webpage that does not implement or incorporate aspects of the completeness detection methods described herein. In some embodiments, user interface 200A may appear on a display device of user system 110, and may have been generated by the retail server system 116. User interface 200A may comprise a search bar 210A which may allow users to provide user input. For example, search bar 210A may receive as input a search query comprising keywords and then display a result of the inputted search query. Portion 245A of user interface 200A may comprise a list of results responsive to the inputted search query in search bar 210A. For example, user interface 200A may display search results 247A, 249A, 251A, 253A, 255A, and 257A in portion 245, where each result represents a specific product or other item that may be responsive to the user's submitted search query. In some embodiments, each of the search results 247A, 249A, 251A, 253A, 255A, and 257A may be associated with a different item category or browse node. In other embodiments, the results 247A, 249A, 251A, 253A, 255A, and 257A may instead all be associated with the same item category, type, or browse node.

Portion 215A of user interface 200A may include a list of item categories, browse nodes and/or subcategories related to the submitted search query. For example, portion 215A may display item category 220A, corresponding to the "Novelty & More" item category, in response to the user-submitted search query of "sport racquet." "Novelty & More," in one embodiment, may represent both an item category and be considered a browse node. Similarly, item categories 220B, 220C, and 220D may also be displayed in portion 215. In some embodiments, the displayed item categories 220A, 220B, 220C, and 220D may be associated with one or more of the products displayed in portion 245. For example, result 251A, "Super Tennis and Walking Shoes," may be connected to the "Men's Fashion" item category. In some embodiments, portion 215 may also display subcategories or browse nodes under relevant item categories. For example, user interface 200 may display subcategories or browse nodes 235A, 235B, and 235C under item category 220C "Sports & Fitness." The displayed browse nodes may be associated with one or more items displayed in portion 245. For example, result 249A "Gamma Tennis Racquet" may be categorized under browse node 235C "Tennis Rackets." In some embodiments, individual categories displayed in portion 215 may be associated in the retail server system with the search query without necessarily having any items within those categories included in the displayed item search results in portion 245. It will be appreciated that in FIG. 2A, the item categories, browse nodes, and search results displayed in interface 200 may not necessarily be relevant to the user-submitted search query in search bar 210. For example, user interface 200 may display browse node 225 "Girls' Novelty Dresses" even though the search query displayed in search bar 210 is "sport racquet." Similarly, search result 255A "Racquet Sports Sound Effects" may reference "racquet sports" but may ultimately not be a result that users select in response to the search query "sport racquet" because users may not consider that item relevant to their search.

In FIG. 2B, user interface 200B depicts a webpage that has been generated in accordance with aspects of the completeness detection methods described herein. In FIG. 2B, portion 245B of user interface 200B may comprise a list of results that users have historically selected or purchased from after submitting the search query "sport racquet" in search bar 210B. For example, user interface 200B may display search results 247A "Carbon Fiber Badminton Racquet," 249A "Gamma Tennis Racquet," 251B "Table Tennis Racket Set," 253B "Junior Tennis Racquet," 255B "Retro Wooden Tennis Racquet," and 257B "Badminton Racket with Cover" in portion 245B in response to the user's submitted search query "sport racquet." It will be appreciated that, by utilizing completeness detection methods described herein, the number of results mentioned in search bar 210B and presented in portion 245B may be lower than the number of results displayed in a user interface (e.g., user interface 200A) without utilizing the completeness detection methods described herein.

Similarly, portion 215B of user interface 200B may comprise a list of item categories and browse nodes or subcategories closely related to the submitted search query. For example, portion 215B may display item category 220C, corresponding to the "Sports & Fitness" item category but may not display item categories or browse nodes associated with a low completeness score associated with the query. For example, portion 215B in FIG. 2B may not display the item category "Novelty & More" or a browse node "Girls' Novelty Dresses" (which were shown in the user interface of FIG. 2A for the same search query) if the item category and/or browse node are associated with a low completeness score in relation to the search query "sport racquet." In one embodiment, the retail server or other system responsible for generating the user interface 200B and/or for generating search results may apply a filter to an initial list of browse nodes and/or items responsive to a search query in order to filter out browse nodes and/or items for which a completeness score is below a predefined threshold or that don't appear in the top N (e.g., ten) resulting nodes when ranked by completeness score. Relative to the user interface illustrated in FIG. 2A, the user interface of FIG. 2B, in which filters may have been applied by the retail server 116 based on completeness scores of browse nodes, has excluded both low relevance browse nodes (such as "Novelty & More") and low relevance items (such as product 253A, 255A and 257A).

Portion 215B may also display selectable refinement options associated with the search query and search results. For example, portion 215B may include a "Material" refinement category 260, which may further include refinements 262A, 262B, and 262C. In some embodiments, the displayed refinements may be selected by a user to filter or narrow down the displayed search results according to the selected refinement. For example, if a user selects the "Aluminum" refinement 262C, user interface 200 may update the listed search results in portion 245 to only display items associated with the "Aluminum" refinement. Therefore, the user may more easily search and browse for a specific item or type of item while simultaneously avoiding categories of items that the user is not interested in (e.g., a user may not want to purchase a heavy, steel tennis racket and may select the "Aluminum" refinement to specifically look for light, aluminum tennis rackets). In some embodiments, the refinements and refinement types themselves may be associated with a completeness score, and the refinement or refinement types may be displayed by examining historical data of user actions. For example, if over 90% of all users over the past three months who search for "sport racquet" also select a material refinement to further narrow the search results, then the type completeness detection system may assign the "Materials" refinement a high completeness score in relation to the "sport racquet" query. The user interface 200B may therefore display the "Material" refinement type whenever a subsequent user inputs a "sport racquet" query.

Figure 3:
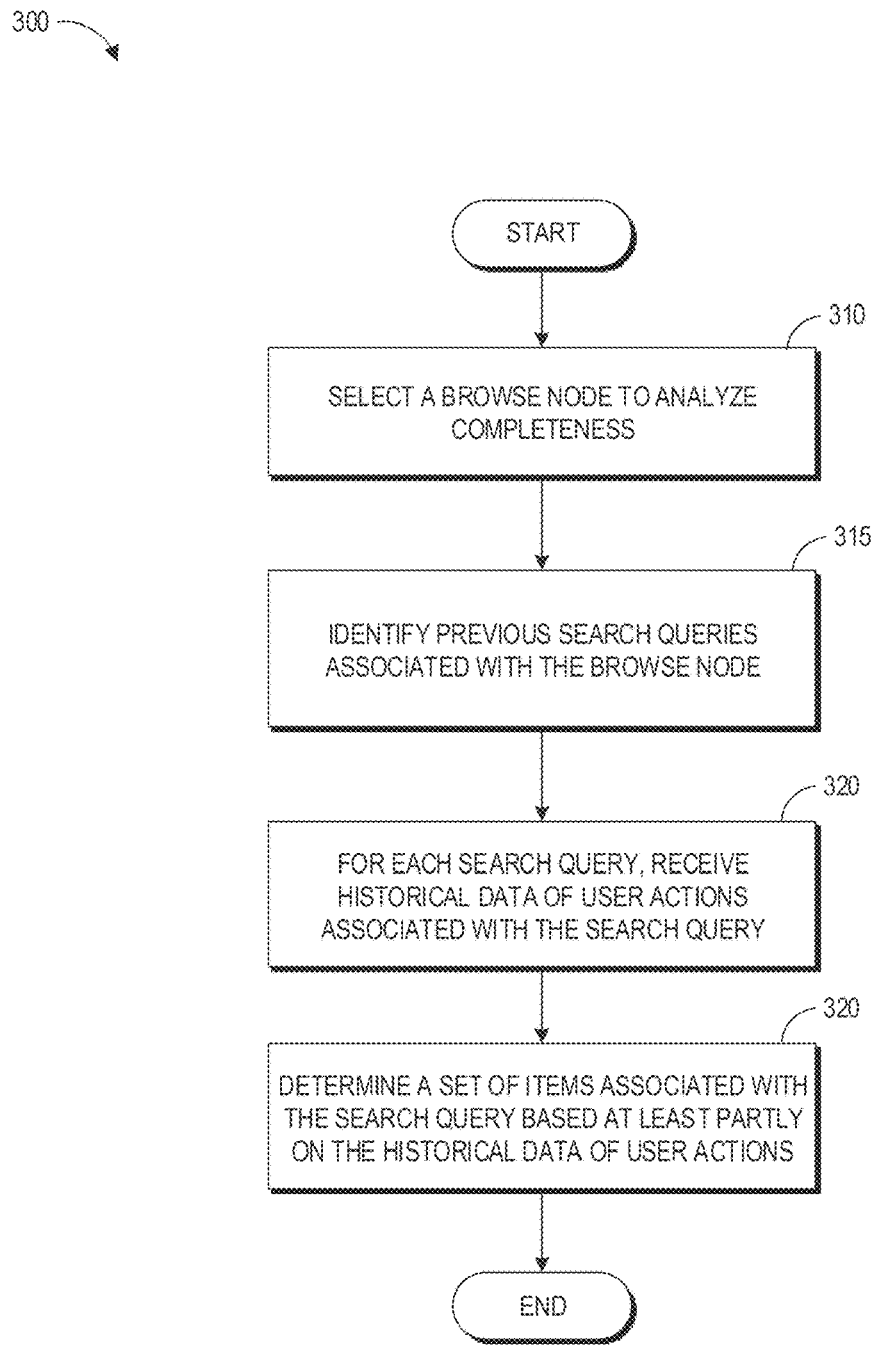
FIG. 3 is a flow diagram depicting an example method of generating or selecting a subset of items to be considered in node or type completeness analysis, according to some embodiments.

FIG. 3 is a flow diagram depicting an example method of generating or selecting a subset of items to be considered in browse node completeness analysis. The methods discussed below with respect to FIGS. 3 and 4 may be implemented, for example, by the type completeness detection system 120, alone or in combination with the retail server system 116, in some embodiments. Type completeness detection system 120 may first select a browse node or item type to analyze for completeness in block 310. For example, among the plurality of browse nodes present in an electronic catalog, the type completeness detection system may initiate the illustrative type completeness detection method by analyzing the first browse node in an ordered list (e.g., alphabetical order) of browse nodes or item types. In some embodiments, the item type may be the item type associated with the most clicks, selections, or searches by users within a predetermined time frame (e.g., the past 3 months). In some embodiments, the received or selected item type may instead correspond to the item type associated with the most number of purchased products. For example, if 60% of all product purchases over the last 10 days were products associated with the "Clothing" item type or category, then "Clothing" may be the received item type in order for the type completeness detection system 120 to begin addressing potential search frustrations of users with the most viewed or purchased item types. In some embodiments, the item type may instead be received randomly from the retail server system 116. Although the method in FIG. 3 begins by determining an item type or browse node, it will be appreciated that the type completeness detection method does not necessarily need to begin by receiving or selecting an item type.

In block 315, type completeness detection system 120 may identify customer search queries related to the item type. For example, given an item type of "Clothes," the type completeness detection system may examine previously-submitted search queries and determine if the browse node "Clothes" was selected last in a user's search or browse session. In some embodiments, the type completeness detection system may identify which search queries are associated with the browse node based at least partly on semantic or textual similarity between the browse node and search query. For example, given the browse node "Clothes," the type completeness detection system may identify search queries containing the keyword "clothes" or "clothing" and that have been selected or clicked on by a user during the relevant browse or search session. In some embodiments, the list of search queries may be narrowed or filtered to only a certain number of most popular related search queries, the queries that had the most subsequent browse or purchase activity, and/or based on other factors.

In block 320, the type completeness detection system may, for each search query, receive historical data of user actions associated with the search query. In some embodiments, each search query may be associated with a unique search query identifier, and the search query identifier may be associated with information specific to that search query. For example, a particular search query may be associated with historical data tracking the number of clicks or selections a user makes after submitting the search query, the order of selections, and the identity of any browse nodes, items, item categories, or refinements that the user selects in response to the search query.

In block 325, the type completeness detection system may determine a set of items associated with the search query based at least partly on the historical data of user actions. In some embodiments, the type completeness detection system may include items that users selected or purchased after inputting a search query. In some embodiments, the type completeness detection system may limit the number of items in the set to include only a specific number of items or items meeting certain criteria (such as based on the timing or order of item selection relative to the query submission). For example, the set of items associated with a search query may include only the top twenty most-frequently selected or clicked items during users' search sessions. In some embodiments, the set of items may be determined by other criteria. For example, the type completeness detection system may identify the top ten items that are associated with the most purchases associated with the search query within a given time frame (e.g., the past two weeks). In some embodiments, the number of items in the set may be a predetermined number determined by an administrator user. In other embodiments, the number of items in the set may be determined based at least partly on historical customer behavior over a period of time. For example, the type completeness detection system may examine the purchase histories of all users who purchased an item after submitting a specific search query (e.g., "tennis racquets") and determine that a total of thirty-two items were purchased over the past two weeks from among those search results. The completeness detection system may therefore limit the set of items at block 325 to the top thirty-two most-purchased items over the past two weeks. Once a set of items has been determined for each search query associated with the browse node, the set of items may be used in illustrative method 400, discussed below.

Figure 4:
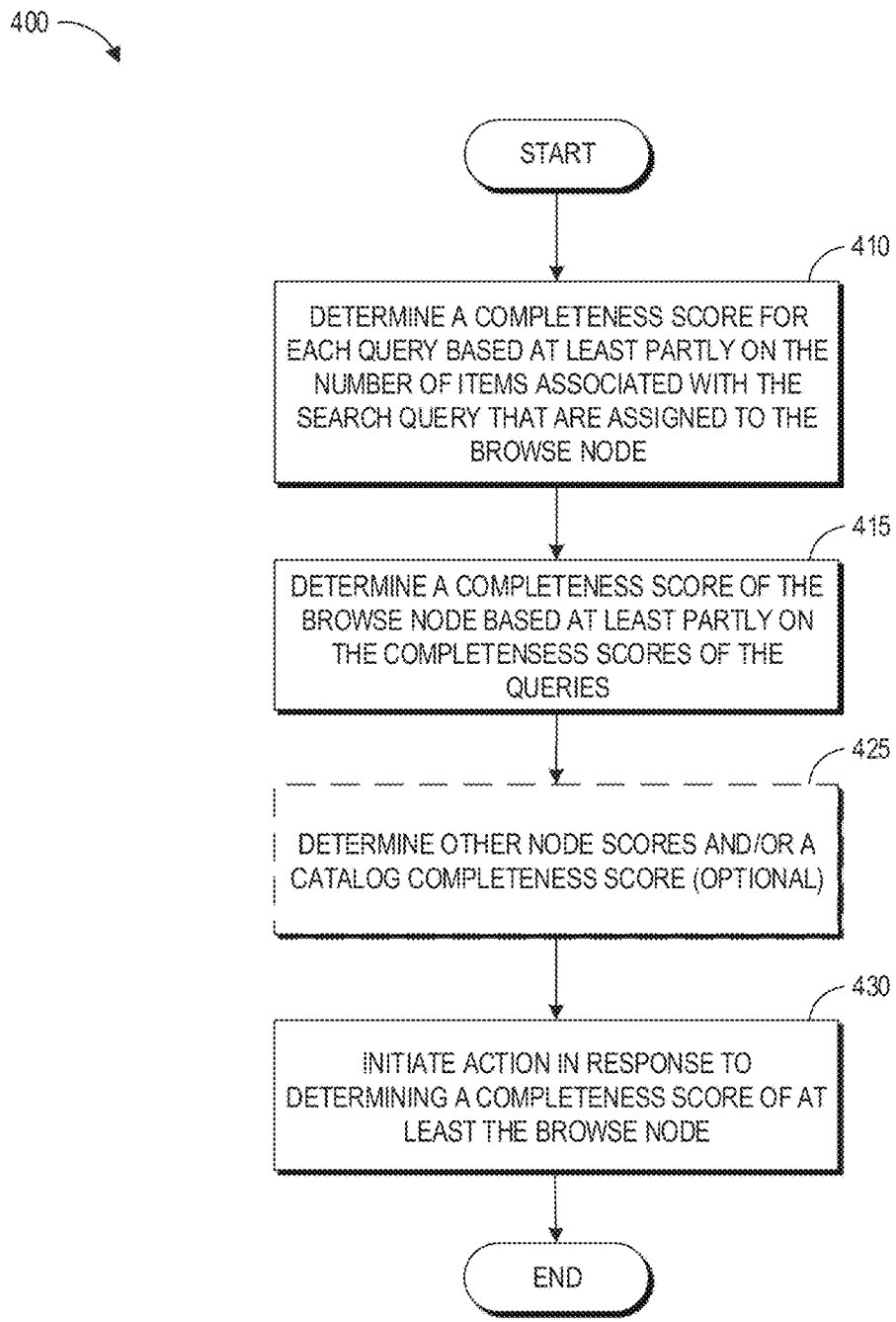
FIG. 4 is a flow diagram depicting an example method of detecting node or type completeness, according to some embodiments.

FIG. 4 is a flow diagram depicting an example method of determining a completeness score of a browse node. In block 410, the completeness detection system may utilize the set of items determined for each of one or more search queries in FIG. 3 to determine a query completeness score for each query. In some embodiments, the completeness score for each query may be based at least partly on the number of items associated with the search query that are currently assigned to the browse node (selected at block 310 above) in the electronic catalog. For example, a search query "computer monitors" that is associated with the browse node "Monitors" may have a completeness score of 0.8 if ten items are included in the set of items associated with the query and eight of those ten items belong to the "Monitors" browse node. In some embodiments, a lower proportion of items belonging to a particular browse node may correspond to a lower completeness score for the particular query. For example, given the search query "baby shampoo" and the browse node "Shampoo," the query may be associated with a low completeness score (e.g., 0.08) if the majority of the determined items are not currently placed under the "Shampoo" browse node.

In some embodiments, the completeness score for a search query may be defined according to a proportion of relevant items (such as may have been determined in FIG. 3 above) that are assigned to a given browse node. For example, for a browse node N, the type completeness detection system 120 may identify the k most frequent queries Q where N was the last browse node viewed or purchased from in the individual search query sessions. For every query q∈Q the type completeness detection system 120 may identify the top n most search impressed items $A_{q,n}$, wherein the number of items in $A_{q,n}$ that are assigned in node N may be defined as the completeness score of the query, in one embodiment. In some embodiments, the completeness score of a query q given a browse node N may be defined as:

$$c_q = \frac{1}{n}\sum_{i=1}^{n} \mathbb{1}\,[a_i \in N]$$

where $a_i \in A_{q,n}$, and $1[a_i \in N]=1$ if $a_i \in N$, else 0. In some embodiments, the completeness score associated with a query may also be weighted. For example, in some embodiments, the query completeness score may be weighted by a variety of item conversion metrics, as discussed above. It will be appreciated that a query completeness score may not need to be calculated in some embodiments of the completeness detection methods described herein. For example, a completeness score for a browse node (as will be discussed below with respect to block 415) may be determined based on the items associated with multiple search queries without necessarily first determining separate query-level completeness scores for each of the individual queries.

In block 415, the completeness detection system may determine a completeness score of the browse node based at least partly on the completeness scores of the individual queries associated with the browse node or its corresponding item type. In some embodiments, a browse node completeness score may be determined by aggregating the completeness scores of each search query associated with the given browse node. For example, the completeness detection system may use a weighted average to define a browse node completeness score as:

$$c_n = \sum_{j=1}^{k} c_{q_j} * w_j, \text{ where } q_j \in Q \text{ and } w_j = \frac{f_j}{\sum_j f_j}$$

As mentioned above, the browse node completeness score may be a numerical value between 0 and 1 (e.g., 0.6) or a percentage value between 0% and 100% (e.g., 60%). In some embodiments, a higher numerical value of the browse node completeness score may indicate a higher completeness level associated with the particular browse node. A higher browse node completeness score may indicate that the browse node is not poorly populated or that many items are properly assigned to the browse node. It will be appreciated that, in some embodiments, the browse node completeness score may not be based on one or more query completeness scores. For example, in some embodiments, the completeness score of a browse node may be calculated by determining the number of items (and/or percentage or ratio of items) responsive to one or more queries that are actually assigned to or associated with the particular browse node.

In block 425, the type completeness detection system may optionally determine a browse node completeness score for other browse nodes and/or determine a catalog completeness score. In some embodiments, the completeness detection system may aggregate the individual browse node completeness scores to determine a completeness metric for a broader item category, a collection of nodes, or even the whole item catalog. At the catalog level, total accuracy of the catalog may be equal to the total completeness of the catalog, meaning that increasing completeness of the catalog improves accuracy of the item classifications, and vice versa. In some embodiments, the completeness metric or score for a collection of nodes may be computed using an equation similar to the equation listed above associated with computing a browse node completeness score. It will be appreciated that block 425 is an optional step and may not necessarily be performed in some embodiments of the completeness detection method described herein.

In block 430, the type completeness detection system may initiate an action in response to determining a completeness score of at least the browse node (and potentially based on completeness scores of multiple browse nodes). For example, in some embodiments, the type completeness detection system may transmit a notification to an administrator of retail server system 116 if the type completeness detection system detects that a browse node is associated with a low browse node completeness score. For example, the type completeness detection system may transmit a text message, e-mail message, or push notification alerting the administrator that the completeness score for a specific browse node falls below a predetermined threshold value (e.g., 0.5 or 50%). In some embodiments, the predetermined threshold value may be initially set by an administrator user and may also be adjustable by the administrator user.

In some embodiments, the transmitted message may also include a recommendation to take a certain action. For example, the type completeness detection system may transmit an e-mail message to an administrator account (or a message delivered within an administrative user interface) indicating that a browse node has a very low completeness score and that the administrator should consider removing the node from the electronic catalog to avoid customer frustration or confusion. In some embodiments, the type completeness detection system may recommend a user add a browse node to the electronic catalog. For example, if the type completeness detection system determines that existing browse nodes have low completeness scores when a user searches for a specific search query (e.g., "fidget spinner"), then the system may automatically recommend that the administrator user add a browse node to the electronic catalog titled "Fidget Spinners" based at least partly on previous search terms submitted by users over a period of time.

In some embodiments, the system may relocate a node to a different item type or category, add a node, or merge two nodes together. In some embodiments, the system may identify one or more items to add or remove from the browse node in order to increase the browse node completeness score. In some embodiments, the type completeness detection system may automatically initiate an action without necessarily transmitting a notification or waiting for user input. For example, the type completeness detection system may automatically include additional browse nodes to display in a user interface when a user submits a particular search query if the additional browse nodes are determined to have a high browse node completeness score associated with the given search query.

Figure 5:
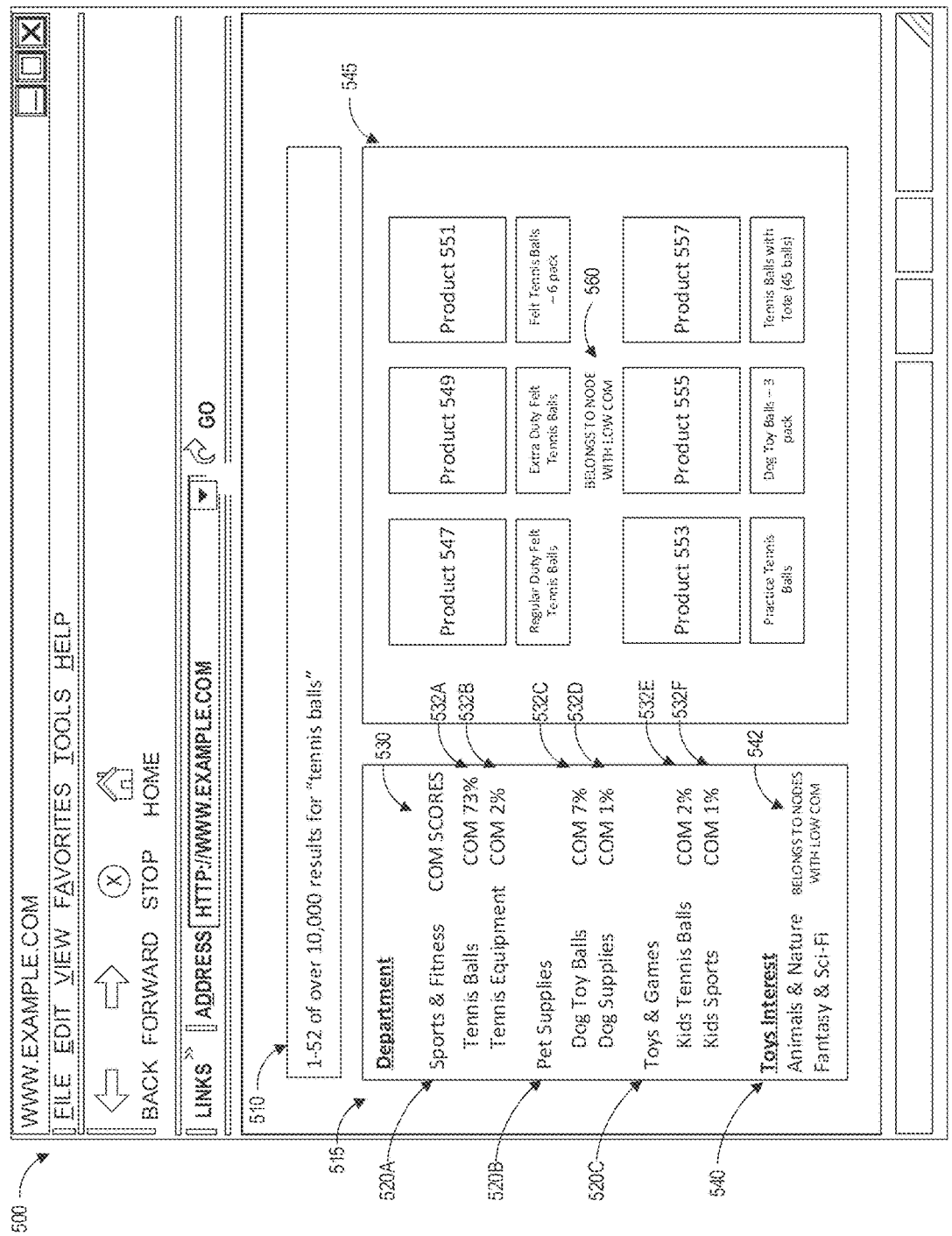
FIG. 5 is an example user interface displaying the results of a search query applying a node or type completeness detection method from a user's perspective, according to some embodiments.

FIG. 5 is an example user interface displaying completeness score information to a user, according to some embodiments. User interface 500 depicts a webpage that includes output determined in the completeness detection methods described herein and displays completeness score information to the user, such as an administrative user. Portion 545 of user interface 500 may comprise a list of results that users have historically selected or purchased from after submitting the search query "tennis balls" in search bar 510. For example, user interface 500 may display search results 547 "Regular Duty Felt Tennis Balls," 549 "Extra Duty Felt Tennis Balls," 551 "Felt Tennis Balls—6 Pack," 553 "Practice Tennis Balls," 555 "Tennis Ball Pick Up Hopper," and 557 "Tennis Balls with Tote (45 balls)" in portion 245 in response to the user's submitted search query "tennis balls." Portion 545 may also include message 560 to provide a warning to an administrator user that a search result displayed in user interface 500 is assigned to a browse node with a low browse node completeness score. In some embodiments, an administrator user may take action upon receiving message 560 (e.g., deleting product 555 or the associated browse node from the list of displayed results).

Similarly, portion 515 of user interface 500 may comprise a list of item categories and browse nodes or subcategories displayed in response to the submitted search query. For example, portion 515 may display item categories 520A-C in response to receiving a search query "tennis balls" in search bar 510. The type completeness detection system may also display a list 530 that displays completeness scores (identified as "COM SCORES") associated with each browse node displayed in portion 515. For example, the list 530 may include a browse node completeness score 532A for the "Tennis Balls" browse node and another completeness score 532B for the "Tennis Equipment" browse node. Similarly, completeness scores 532C-F may each correspond to a "Dog Toy Balls" node, a "Dog Supplies" node, a "Kids Tennis Balls" node, and a "Kids Sports" node respectively. In some embodiments, portion 515 may also display refinement type 540 that a user may select or click on to further refine or narrow the search results displayed in portion 545. The completeness detection system may also display a message 542 indicating that a particular refinement (e.g., "Animals & Nature") is associated with browse nodes that have low browse node completeness scores.

In some embodiments other than that illustrated in FIG. 5, an interface similar to interface 500 may additionally include an indication of the number of search results that are associated with each of item categories 520A-C for consideration by an administrator user. In some embodiments, the interface 500 may present to an administrator user an option to take action if a browse node completeness score is below a certain threshold value. For example, if the browse node completeness score of a browse node falls below a threshold value (e.g., 5%), the interface 500 may present an option to hide the particular browse node from the display or rank the browse node lower, thereby influencing the user interface 500 to display refinements of browse nodes associated with a higher browse node completeness score. It will be appreciated that a user may view a browse node associated with a low completeness score for further analysis or action.

Figure 6:
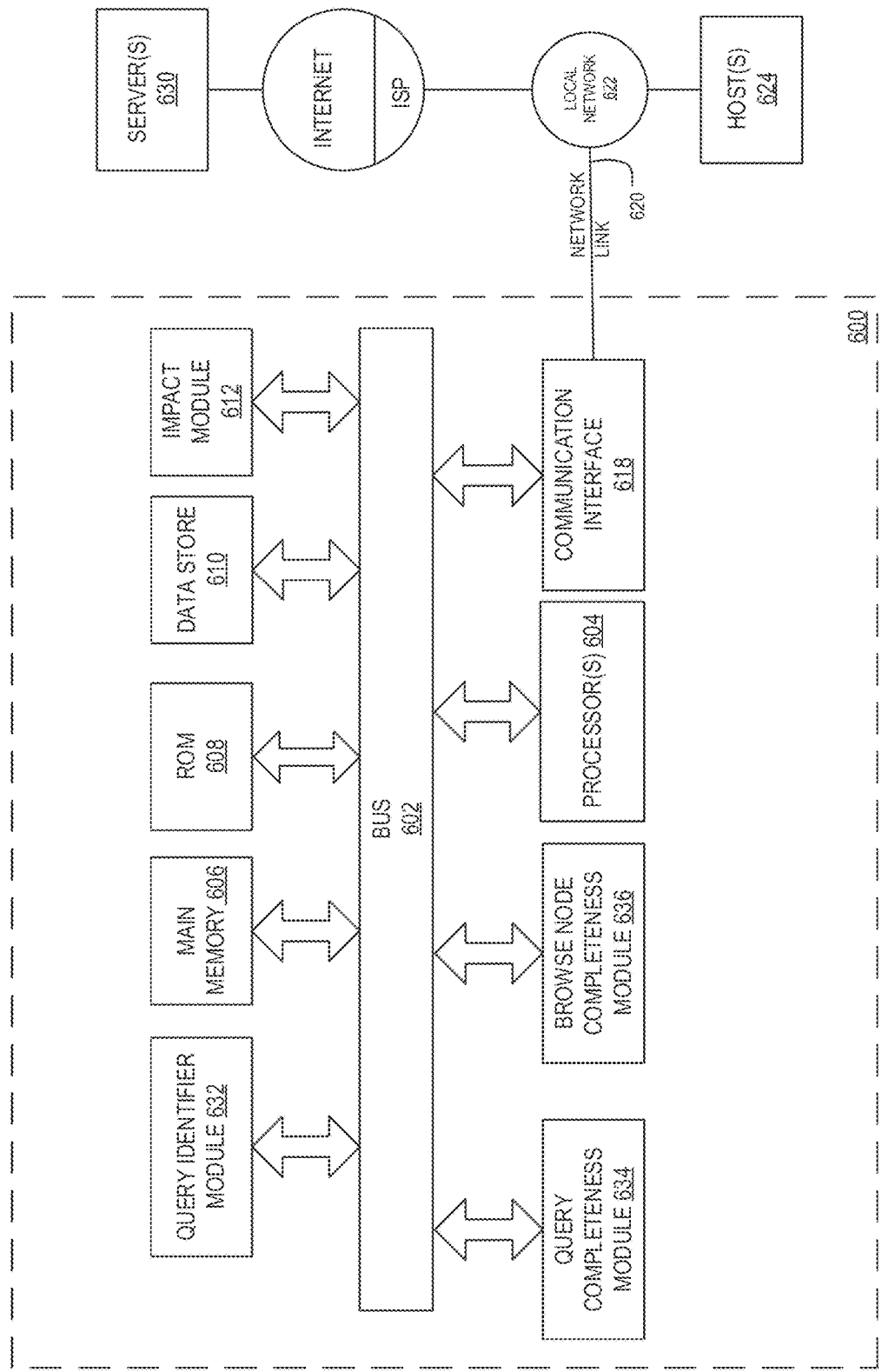
FIG. 6 is a diagram of an example computing system configured to perform type completeness detection described herein.

FIG. 6 is a block diagram of an illustrative computing system that may implement one or more of the features described. The computing system 600 may be configured to perform all or some of the features of the type completeness detection system 120. The computing system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

The computing system 600 also includes a main memory 606, such as a random access memory (RAM), cache, or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render the computing system 600 into a special-purpose machine that is customized to perform the operations specified in the instructions.

The computing system 600 further includes a read only memory (ROM) 608 or other static storage device coupled to bus 602 for storing static information and instructions for processor 604. Storage device 610, such as a magnetic disk, optical disk, or USB thumb drives (Flash drives), etc., is provided and coupled to bus 602 for storing information and instructions.

The computing system 600 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 600 to be a special-purpose machine. According to one embodiment, the techniques herein may be performed by the computing system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

As part of a special-purpose machine, the computing system 600 may include query identifier module 632, query completeness module 634, browse node completeness module 636, and impact module 612. According to one embodiment, query identifier module 632 may, given a selected browse node, track which search queries involve search sessions where a user last selected the given browse node during a search session. In some embodiments, query completeness module 634 may determine a completeness score for a search query. In some embodiments, browse node completeness module 636 may compute a browse node completeness score based at least partly on an aggregation of individual search query completeness scores. In some embodiments, the impact module 612 may transmit a notification that one or more nodes have a low completeness score and may recommend an action in response. In some embodiments, the impact module 612 may automatically initiate an action in response to determining completeness scores for browse nodes. According to one embodiment, instructions may be transmitted through communication interface 618 to one or more servers 630. The instructions transmitted may be stored in ROM 608 in one embodiment.

Various forms of computer readable storage media may be involved in carrying one or more sequences of one or more computer readable program instructions to processor 604 for execution. For example, the instructions may initially be carried on a magnetic disk or solid state drive of a remote computer. The bus 602 may carry data to main memory 606, from which processor 604 retrieves and executes the instructions.

The computing system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the Internet 628 to a server 630.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a c system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A type completeness detection system can be or include a microprocessor, but in the alternative, the type completeness detection system can be or include a controller, microcontroller, or state machine, combinations of the same. A type completeness detection system can include electrical circuitry configured to process computer-executable instructions. Although described herein primarily with respect to digital technology, a type completeness detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a type completeness detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the type completeness detection system such that the type completeness detection system can read information from, and write information to, the storage medium. In the alternative, the storage medium can be integral to the type completeness detection system. The type completeness detection system and the storage medium can reside in an ASIC. The ASIC can reside in a user terminal. In the alternative, the type completeness detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A system comprising:
   a memory storing computer-executable instructions; and
   one or more hardware processors in communication with the memory and configured by the executable instructions to at least:
   select a browse node associated with a subset of items in an electronic catalog;
   identify one or more previous search queries related to the browse node, wherein the one or more previous search queries are associated with requests from users to search for items in the electronic catalog;
   determine a plurality of items for a previous search query of the one or more previous search queries, wherein the plurality of items comprises items that have been previously selected or purchased by at least one user who submitted the previous search query;
   determine a browse node completeness score for the browse node based at least partly on a number of items from the plurality of items that are associated with the browse node;
   determine that the browse node completeness score is below a predetermined threshold value; and
   initiate a responsive action associated with the browse node based on the browse node completeness score level falling below the predetermined threshold value, wherein the responsive action comprises at least one of (a) creating a new browse node with a name determined at least in part from the one or more previous search queries, or (b) adding, to the browse node, one or more of the items that have been previously selected or purchased by at least one user who submitted the previous search query.

2. The system of claim 1, wherein the one or more previous search queries comprises at least a first search query and a second search query, wherein the first search query is associated with a first query completeness score and the second search query is associated with a second query completeness score.

3. The system of claim 2, wherein the browse node completeness score is a weighted average of at least the first query completeness score and the second query completeness score.

4. The system of claim 1, wherein the plurality of previous search queries are associated with requests from users to search for items in the electronic catalog in a predetermined time frame.

5. The system of claim 1, wherein the one or more hardware processors are further configured to identify a refinement associated with the browse node.

6. The system of claim 1, wherein the one or more previous search queries are associated with searches where users select or purchase from the browse node last in a search or browse session.

7. The system of claim 1, wherein the one or more previous search queries are determined based at least in part on a historical log of user search queries.

8. The system of claim 1, wherein the plurality of items for a previous search query in the one or more previous search queries comprises a predetermined number of most-frequently selected or purchased item associated with the previous search query.

9. The system of claim 1, wherein an item in the plurality of items is associated with a second browse node other than the browse node.

10. The system of claim 1, wherein the responsive action comprises identifying one or more items to add to the browse node.

11. A computer-implemented method comprising:
    selecting a browse node associated with a subset of items in an electronic catalog;
    identifying one or more previous search queries related to the browse node, wherein the one or more previous search queries are associated with requests from users to search for items in the electronic catalog;
    determining a plurality of items for a previous search query of the one or more previous search queries, wherein the plurality of items comprises items that have been previously selected or purchased by at least one user who submitted the previous search query;
    determining a browse node completeness score for the browse node based at least partly on a number of items from the plurality of items that are associated with the browse node;
    determining that the browse node completeness score is below a predetermined threshold value; and
    initiating a responsive action associated with the browse node based on the browse node completeness score level falling below the predetermined threshold value wherein the responsive action comprises at least one of (a) creating a new browse node with a name determined at least in part from the one or more previous search queries, or (b) adding, to the browse node, one or more of the items that have been previously selected or purchased by at least one user who submitted the previous search query.

12. The method of claim 11, further comprising transmitting a notification to a user regarding the responsive action.

13. The method of claim 11, wherein the predetermined threshold value is adjustable by a user.

14. The method of claim 11, wherein the responsive action further comprises merging the browse node with another browse node.

15. The method of claim 11, wherein the responsive action is initiated automatically after determining the browse node completeness score without input from a user.

16. The system of claim 1, wherein the one or more previous search queries related to the browse node are identified based on a determination that at least a portion of each of the one or more previous search queries matches an alphanumeric label assigned to the browse node.

* * * * *